UNITED STATES PATENT OFFICE

JULES LEON AUGUSTIN CREUSE, OF BROOKLYN, NEW YORK.

IMPROVEMENT IN MEDICAL COMPOUNDS.

Specification forming part of Letters Patent No. 121,338, dated November 28, 1871.

*To all whom it may concern:*

Be it known that I, JULES LEON AUGUSTIN CREUSE, of Brooklyn, in the county of Kings and State of New York, have invented a certain Medical Compound, of which the following is a specification:

The iodide of iron is one of the most important and useful curative agents known in pharmacy; but the medical compounds thereof, as heretofore made, have a harsh, inky, disagreeable taste, so bad that many patients are unable to use them; and they moreover blacken the teeth, and, in some cases, produce constipation.

The object of this invention is to provide a stable and tasteless medical compound of iodide of iron. My improvement consists of a medical compound formed by combining the sesqui-iodide of iron with a vegetable salt.

I have discovered that the sesqui-iodide of iron, though very unpleasant and even caustic in taste, has the property of combining with various vegetable salts, forming compounds almost tasteless, which may practically be kept unaltered any length of time.

The vegetable salts which I have found to have such an effect are: the citrates, tartrates, and oxalates of potassa, soda, ammonia, and lithia, or any mixture of these different salts. Of all these the combination of sesqui-iodide of iron with citrate of potassa seems to me the best suited for medicinal purposes, though I do not limit myself to the use of the citrate of potassa, as either of the other salts named may be employed.

In the production of my improved stable and tasteless iodide of iron I take: iron filings, 28 parts or more; pure iodine, 189.4 parts; citric acid, 201 parts; bicarbonate of carbonate of potassa, a sufficient quantity. Combine 126.3 parts of the iodine with the iron filings in slight excess by means of water as usually prescribed by pharmacopœias. Filter. Add to the filtrate 63.1 parts of the iodine. Dissolve and mix with the citric acid previously saturated by potassa. Evaporate and dry.

To produce a combination with citrates of soda, ammonia, and lithia I operate in the same manner and with the same proportions as described, only saturating the citric acid by soda, ammonia, and lithia, or their carbonates or bicarbonates.

Instead of one only of these alkalies being used for saturating the citric acid, any mixture of them will give the same result.

The combination with the various alkaline tartrates are obtained in the same manner, using 225 parts of tartaric acid instead of citric acid for the same proportions of the other ingredients.

The combinations with the various alkaline oxalates are obtained in the same manner, using only 126 parts of oxalic acid instead of citric acid, the other ingredients remaining the same.

The advantages I claim for medical compounds formed as described, are: First, they have none of the harsh inky taste of common iodide of iron, which prevents so many patients from taking it, no matter how disguised. Second, they do not blacken the teeth. Third, they do not produce constipation. Fourth, they may be mixed with preparations of Peruvian bark, usually indicated in the same complaints. Fifth, they keep indefinitely in contact with air, either in the dry state or in solution, provided the dry salt be kept from moisture and from the direct rays of the sun.

The solutions of my improved compound must be kept from direct sunlight, and protected by either sixteen per cent. of alcohol or a quantity of sugar sufficient to make an officinal sirup.

Having thus described my invention, I claim as new and desire to secure by Letters Patent—

A medical compound, formed by the combination of sesqui-iodide of iron and vegetable salts, substantially as herein described.

JULES L. A. CREUSE.

Witnesses:
 T. B. MOSHER,
 GEORGE W. MABEE.

(98)